(12) United States Patent
Jia et al.

(10) Patent No.: US 11,670,039 B2
(45) Date of Patent: Jun. 6, 2023

(54) TEMPORAL HOLE FILLING FOR DEPTH IMAGE BASED VIDEO RENDERING

(71) Applicant: Dolby Laboratories Licensing Corporation, San Francisco, CA (US)

(72) Inventors: Wenhui Jia, Dublin, CA (US); Haricharan Lakshman, Sunnyvale, CA (US); Ajit Ninan, San Jose, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 255 days.

(21) Appl. No.: 16/809,344

(22) Filed: Mar. 4, 2020

(65) Prior Publication Data

US 2020/0286293 A1    Sep. 10, 2020

Related U.S. Application Data

(60) Provisional application No. 62/813,286, filed on Mar. 4, 2019.

(51) Int. Cl.
*G06T 15/20* (2011.01)
*G06T 19/00* (2011.01)
(Continued)

(52) U.S. Cl.
CPC .......... *G06T 15/205* (2013.01); *G06T 3/0093* (2013.01); *G06T 5/005* (2013.01);
(Continued)

(58) Field of Classification Search
None
See application file for complete search history.

(56) References Cited

U.S. PATENT DOCUMENTS 8,253,740 B2 * 8/2012 Varekamp ............. G06T 15/205
345/427
8,411,931 B2    4/2013 Zhou
(Continued)

FOREIGN PATENT DOCUMENTS

CN    106028020    10/2016
WO    2009091563   7/2009

OTHER PUBLICATIONS

De Oliveira, A. et al "An Artifact-Type Aware DIBR Method for View Synthesis" IEEE Signal Processing Letters, vol. 25, No. 11, Nov. 2018, pp. 1705-1709.
(Continued)

*Primary Examiner* — Anand P Bhatnagar

(57) ABSTRACT

Bordering pixels delineating a texture hole region are identified in a target image. Depth values of the bordering pixels are automatically clustered into two depth value clusters. A specific estimation direction is selected from multiple candidate estimation directions for a texture hole pixel in a texture hole region. A depth value of the texture hole pixel is estimated by interpolating depth values of two bordering background pixels in the specific estimation direction. The estimated depth value is used to warp the texture hole pixel into a reference view represented by a temporal reference image. A pixel value of the texture hole pixel is predicted based on a reference pixel value of a reference pixel from the reference image to which the texture hole pixel is warped using the estimated depth value.

12 Claims, 15 Drawing Sheets

(51) Int. Cl.
  *G06T 3/00* (2006.01)
  *G06T 7/529* (2017.01)
  *H04N 19/46* (2014.01)
  *G06T 5/00* (2006.01)

(52) U.S. Cl.
  CPC ............ *G06T 7/529* (2017.01); *G06T 19/006* (2013.01); *H04N 19/46* (2014.11); *G06T 2207/10028* (2013.01); *G06T 2215/16* (2013.01)

(56) References Cited

U.S. PATENT DOCUMENTS

| | | | |
|---|---|---|---|
| 8,537,200 B2 | 9/2013 | Zhang | |
| 8,611,642 B2 | 12/2013 | Wang | |
| 9,214,040 B2 | 12/2015 | Smolic | |
| 9,237,330 B2 | 1/2016 | Wang | |
| 9,582,928 B2* | 2/2017 | Cho | G06T 15/205 |
| 9,654,765 B2 | 5/2017 | Nguyen | |
| 9,930,363 B2* | 3/2018 | Rusanovskyy | H04N 19/597 |
| 10,070,115 B2 | 9/2018 | Graziosi | |
| 10,123,027 B2 | 11/2018 | Hannuksela | |
| 10,148,930 B2 | 12/2018 | Nguyen | |
| 2009/0115780 A1* | 5/2009 | Varekamp | G06T 15/205 345/419 |
| 2011/0157229 A1 | 6/2011 | Zefeng | |
| 2012/0212480 A1* | 8/2012 | Cho | G06T 15/205 345/419 |
| 2012/0269458 A1 | 10/2012 | Graziosi | |
| 2013/0106848 A1* | 5/2013 | Nguyen | G06T 15/205 345/419 |
| 2013/0127988 A1* | 5/2013 | Wang | H04N 13/264 348/43 |
| 2013/0135298 A1* | 5/2013 | Isogai | G06T 15/04 345/419 |
| 2014/0002595 A1* | 1/2014 | Po | H04N 13/111 348/43 |
| 2015/0201176 A1 | 7/2015 | Graziosi | |
| 2015/0215600 A1* | 7/2015 | Norkin | H04N 13/111 348/43 |
| 2016/0373715 A1 | 12/2016 | Nguyen | |
| 2018/0007395 A1 | 1/2018 | Ugur | |
| 2018/0352209 A1 | 12/2018 | Liu | |
| 2020/0279384 A1* | 9/2020 | Jia | G06T 7/13 |

OTHER PUBLICATIONS

Jung, J. et al "Virtual View Synthesis Using Temporal Hole Filling with Bilateral Coefficients," 2012 IEEE RIVF International Conference on Computing & Communication Technologies, Research, Innovation, and Vision for the Future, Ho Chi Minh City, 2012, pp. 1-4.

Li, S. et al "Hole filling with Multiple Reference Views in DIBR View Synthesis" IEEE Transactions on Multimedia, vol. 20, No. 8, Aug. 2018, pp. 1948-1959.

Yu, W. et al "Combined hole-filling with spatial and temporal prediction," 2013 IEEE International Conference on mage Processing, Melbourne, VIC, 2013, pp. 3196-3200.

Lu, Z. et al "A Novel Filling Disocclusion Method Based on Background Extraction in Depth-Image-Based-Rendering" Latest Trends in Applied Informatics and Computing, 2012.

Luo, G. et al "Foreground Removal Approach for Hole Filling in 3D Video and FVV Synthesis" IEEE Transactions on Circuits and Systems for Video Technology, vol. 27, No. 10, Oct. 2017, pp. 2118-2131.

Oh, Kwan-Jung, et al "Hole-Filling Method Using Depth Based In-Painting For View Synthesis in Free Viewpoint Television (FTV) and 3D Video" Jun. 2009, pp. 1-6.

Po, Lai-Man, et al, "A New Multidirectional Extrapolation Hole-Filling Method for Depth-Image-Based Rendering," 2011 18th IEEE International Conference on Image Processing.

Tauber, Z. et al "Review and Preview: Disocclusion by Inpainting for Image-based Rendering," IEEE Transactions on Systems, Man, and Cybernetics, Part C, vol. 37, Issue 4, pp. 527-540, Jul. 2007.

Xi, M. et al "Depth-image-based rendering with spatial and temporal texture synthesis for 3DTV". J Image Video Proc 2013, (Sep. 2013).

Xu, X. et al "Depth-Aided Exemplar-based Hole Filling for DIBR View Synthesis" IEEE, pp. 2840-2843, May 2013.

Yen, Shwu-Huey, et al "Direction Hole-Filling Method for a 3D View Generator" vol. 11, Issue 2, 2015.

* cited by examiner

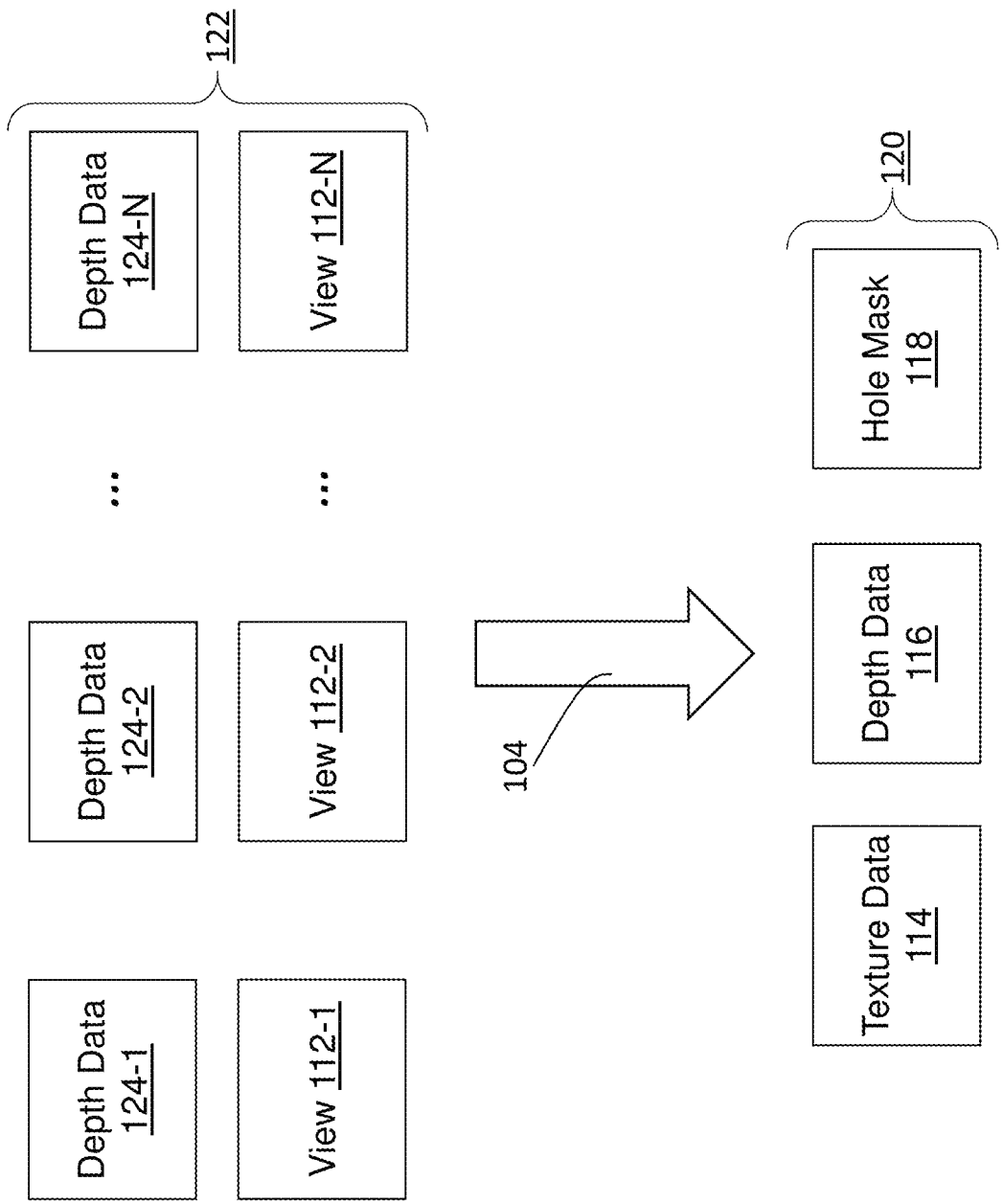

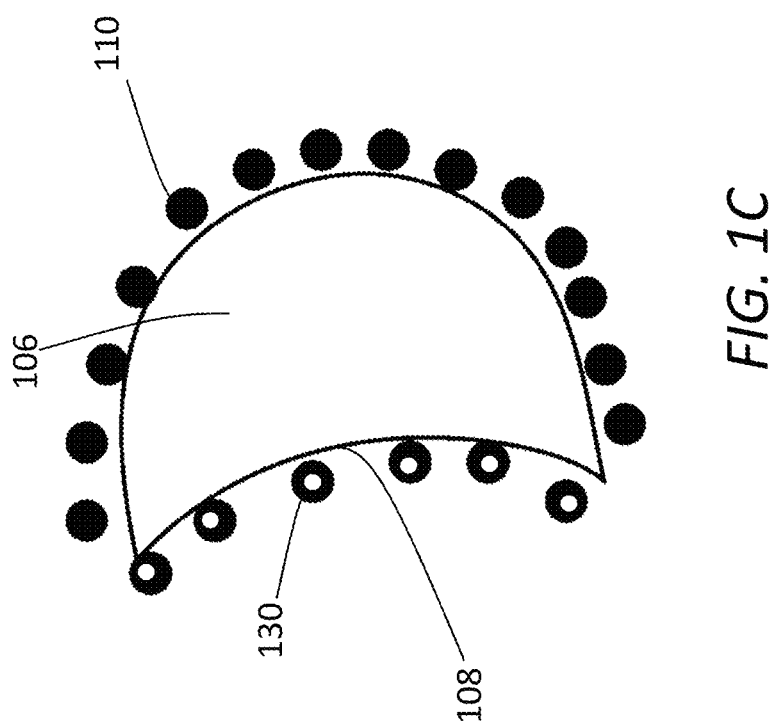

identify bordering pixels delineating a texture hole region in an image 432 record depth values of the bordering pixels 434 cluster the depth values into two depth value clusters with a depth value threshold 436 select a specific estimation direction from multiple candidate estimation directions 438 estimate a depth value of a texture hole pixel by interpolation 440 use the estimated depth value to warp the texture hole pixel into a reference view 442 predict a pixel value from the reference view 444

FIG. 4D

TEMPORAL HOLE FILLING FOR DEPTH IMAGE BASED VIDEO RENDERING

CROSS-REFERENCE TO RELATED APPLICATION(S)

The present application claims the benefit of priority to U.S. Provisional Patent Application No. 62/813,286 filed Mar. 4, 2019, which is incorporated herein by reference in its entirety.

TECHNOLOGY

The present invention relates generally to image coding and rendering, and in particular, to hole filling for depth image based rendering.

BACKGROUND

View synthesis is used in applications such as three-dimensional (3D) TV, 360-degree video, volumetric video, virtual reality (VR), augmented reality (AR), and so forth.

As a compromise between geometry based rendering and image based rendering, depth image based rendering (DIBR) is becoming popular because of availability of depth sensors and acceptable amount of data for practical implementations. In DIBR, virtual views are synthesized from existing views with their associated depth information. The existing views are warped to a depicted 3D world and then back projected to a target view position. As a result, background area occluded by a foreground object in an existing view might be disoccluded (without any available image data from the existing views) in a target view from the target view position, thereby creating holes in the target view. In addition, discontinuities in depth image(s) can also cause holes in synthesized views. As the total number of views to be encoded or transmitted in video signals is reduced or minimized in real video display applications, areas of holes in synthesized views generated from the reduced or minimized number of views become relatively large and relatively numerous, thereby creating readily noticeable visual artifacts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A illustrates an example synthesized view;

FIG. 1C illustrates an example texture hole region;

FIG. 4A through FIG. 4D illustrate example process flows; and

DESCRIPTION OF EXAMPLE EMBODIMENTS

Figure 1B:
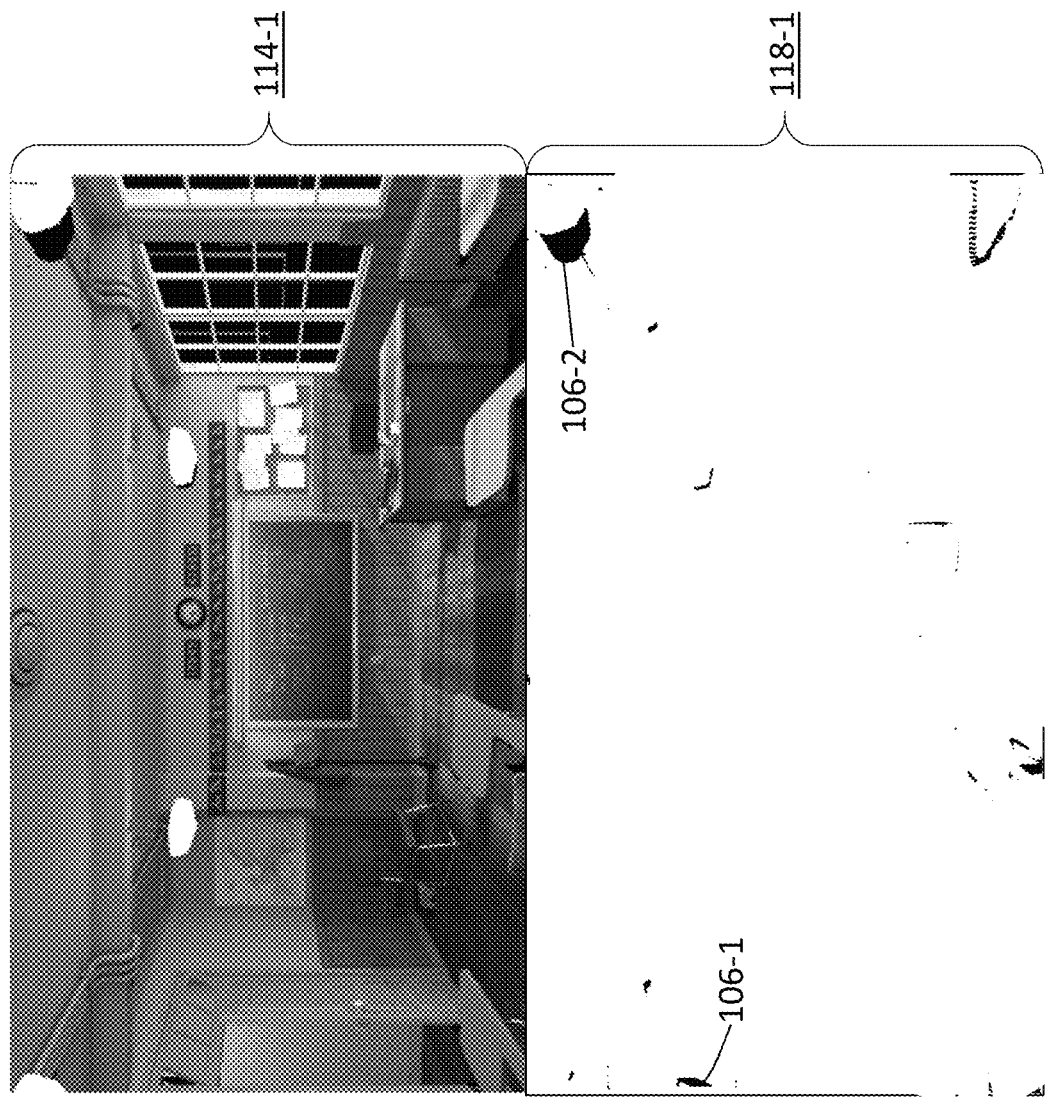
FIG. 1B illustrates example synthesized texture data and a corresponding texture hole mask in a synthesized view.

Example embodiments, which relate to temporal hole filling for synthesized images, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. SYNTHESIZED VIEWS
3. SYNTHESIZED TEXTURE DATA AND HOLE MASK
4. ESTIMATION DIRECTIONS
5. PARALLEL HOLE-FILLING OPERATIONS
6. EXAMPLE VIDEO STREAMING SERVERS AND CLIENTS
7. EXAMPLE PROCESS FLOWS
8. IMPLEMENTATION MECHANISMS—HARDWARE OVERVIEW
9. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Synthesized images generated from pre-synthesized multi-view images may contain texture hole regions that are disoccluded from previously occluded texture regions in the pre-synthesized multi-view images. A texture hole mask can be used to identify existences and locations of any texture hole regions in a synthesized image.

Hole filling may be performed on a frame by frame basis. This is referred to as spatial hole filling. Example spatial hole filling techniques can be found in U.S. Provisional Patent Application No. 62/811,956, with an application title of "HOLE FILLING FOR DEPTH IMAGE BASED RENDERING" by Wenhui Jia, Haricharan Lakshman, and Ajit Ninan, filed on Feb. 28, 2019, the entire contents of which are hereby incorporated by reference as if fully set forth herein.

Temporal hole filling techniques as described herein can be used to fill in pixel values in the texture hole regions. Under these techniques, to fill in pixel values in hole regions for a target image frame (e.g., a synthesized image with hole regions) to be rendered at a target time point, a reference image frame (e.g., a synthesized or non-synthesized image, etc.) at a reference time point (e.g., a previous time point, a subsequent time point, etc.) different from the target time point may be used.

Additionally, optionally or alternatively, video like sequences (e.g., different camera locations/orientations are mapped to different image rendering time points, etc.) can be created from navigation (e.g., camera movements, camera displacements, camera selections, etc.) in volumetric light fields of static scenes. Some or all of the temporal hole filling techniques as described herein can be used to perform hole filling operations with such video like sequences created from static scenes.

Under forward warping approaches, all pixels in a reference view (e.g., a reference image, a reference image frame, etc.) is warped to a target view for the purpose of filling in pixel values in hole regions of the target view. This is feasible when depth information needed by warping operations are available. Even so, only a small portion of the reference view is needed to fill the hole regions of the target view. Warping the whole reference view image frame to find out which pixels are needed to fill the hole regions is likely to be a waste of much computation.

Instead of forward warping in which a reference view is warped into a target view, temporal hole filling techniques as described herein can use backward warping, in which only identified hole regions of a target view is warped to a reference view, to fill hole regions in the target view. Since the hole regions of the target view are expected to be relatively small in comparison with the whole target view image frame or the whole reference view image frame, these techniques can be performed with much less or minimum computation as compared with the forward warping approaches.

To warp the hole regions of the target view to the reference view in time domain, depth information is needed. Techniques as described herein can be implemented to estimate or generate depth information in hole region of an image frame such as the target view image frame in the present example.

Background pixels (e.g., bordering background pixels, nearest background pixels to a texture hole pixel, etc.) used to estimate depth values in each texture hole region or a texture hole pixel therein may be distinguished from non-background pixels (e.g., bordering foreground pixels, nearest foreground pixels to a texture hole pixel, etc.) by automatic clustering or segmentation operations.

In some operational scenarios, estimations of depth values in the texture hole region with the background pixels may be tried with multiple candidate directions. These depth value estimations with different candidate directions can be evaluated with quality measures or indicators to determine or select the best direction for depth value estimation. The best direction for depth value estimation as determined by these quality measures or indicator can be used to compute or estimate depth values in the texture hole region or a depth value of the texture hole pixel in the texture hole region.

In some operational scenarios, depth value estimations and/or temporal hole-filling operations as described herein can be performed with a relatively high level of parallelism or concurrency by digital signal processors (DSPs) or graphics processing units (GPUs). For example, depth value estimations and/or hole-filling operations may be performed in parallel for multiple texture hole regions, for multiple texture hole pixels, and so forth, so long as computing resources such as processing threads of DSPs or GPUs are available. The depth value of a texture hole pixel can be estimated as well as the pixel value of the texture hole pixel can be filled by warping the texture hole pixel to a reference view, independent of any depth value estimation and temporal hole filling operation of a different texture hole pixel.

Additionally, optionally or alternatively, temporal hole filling operations can operate in conjunction with (e.g., concurrently, selectively based on generated image qualities, etc.) spatial hole filling operations.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. SYNTHESIZED VIEWS

FIG. 1A illustrates an example synthesized view 120 derived from one or more pre-synthesized views 112-1, 112-2, . . . 112-N, where N is an integer greater than zero (0). The one or more pre-synthesized views (112-1, 112-2, . . . 112-N) correspond to one or more pre-synthesized depth images 124-1, 124-2, . . . 124-N, respectively.

Each of the pre-synthesized views (112-1, 112-2, . . . 112-N) may be an image (or image frame) generated from image data acquired with one or more of: cameras, image sensors, 3D rendering methods, computer-implemented graphics generation/rendering methods, and so forth. Each of the pre-synthesized depth images (124-1, 124-2, . . . 124-N) may comprise depth information generated from depth data acquired with one or more of: multi-angle image sensors, depth sensors, triangulation, range imaging, radar, coded aperture, and so forth.

By way of example but not limitation, an array of physical cameras, virtual cameras, depth sensors, etc., located at one or more view positions may be used to capture image and depth information of the same physical or virtual scene from different view directions at a specific time point. The captured image and depth information at the specific time point may be processed to generate the pre-synthesized views (112-1, 112-2, . . . 112-N) and the pre-synthesized depth images (124-1, 124-2, . . . 124-N) corresponding to a plurality of different combinations of view positions and/or view directions in reference to the physical or virtual scene.

Each pre-synthesized view in the pre-synthesized views (112-1, 112-2, . . . 112-N) corresponds to a respective pre-synthesized depth image in the depth images (124-1, 124-2, . . . 124-N). The pre-synthesized view and the respective pre-synthesized depth image may respectively contain image data and depth data of the physical or virtual scene along a specific view direction from a specific view position. In other words, the respective pre-synthesized depth image comprises depth information for some or all pixels represented in the pre-synthesized view. Individual depth information (for a pixel represented in the pre-synthesized view) in the respective pre-synthesized depth image may be a distance value (or z-value) along the specific view direction from the specific view position, a disparity value in reference to a zero-disparity plane perpendicularly located at a certain distance from the specific view position along the specific view direction, and so forth.

In some embodiments, the pre-synthesized views (112-1, 112-2, . . . 112-N) and/or the pre-synthesized depth images (124-1, 124-2, . . . 124-N) are included in a multi-view image 122.

The synthesized view (120) can be derived from the pre-synthesized views (112-1, 112-2, . . . 112-N) by performing DIBR operations 104 on the pre-synthesized views (112-1, 112-2, . . . 112-N).

For example, the synthesized view (120) may represent a target view of what the physical or virtual scene has been depicted in the pre-synthesized views (112-1, 112-2, . . . 112-N). The target view may be from a target view position along a target view direction, which are different from any combination of view position and view direction as represented in any of the pre-synthesized views (112-1, 112-2, . . . 112-N).

Each pre-synthesized view in the pre-synthesized views (112-1, 112-2, . . . 112-N) from a specific view position along a specific view direction can be warped by the DIBR operations (104) into a warped image from the target view position along the target view direction based on depth information of pixels represented in the pre-synthesized view. One or more of these warped images can be selected, weighted/unweighted, composed, synthesized, etc., into the synthesized view (120).

Image areas such as a background area occluded by a foreground object in a pre-synthesized view in some or all of the pre-synthesized views (112-1, 112-2, . . . 112-N) may be disoccluded (but without any available image data from the existing views) in the target view from the target view position, thereby creating holes in the target view. In addition, discontinuities in the pre-synthesized depth images (124-1, 124-2, . . . 124-N) can also cause holes in the synthesized view (120).

In some embodiments, as a result of the DIBR operations (104), synthesized texture data 114, associated depth data 116 (which indicates depth information for pixels represented in the texture data (114)) and a texture hole mask 118 (which indicates where holes are in the texture data (114)) are generated for the synthesized view (120). The texture hole mask (118) may be a binary mask comprising an individual binary value for each texture pixel in some or all texture pixels of the synthesized texture data (114). The individual binary value for each such pixel in the texture hole mask (118) indicates whether a valid pixel value exists for the pixel.

3. SYNTHESIZED TEXTURE DATA AND HOLE MASK

FIG. 1B illustrates example synthesized texture data 114-1 and a corresponding texture hole mask 118-1 in a synthesized view generated from one or more views and their corresponding depth images using DIBR operations.

As shown in the texture hole mask (118-1), the texture data (114-1) depicts an image with one or more texture hole regions such as 106-1, 106-2, etc., in which pixels contain no available image data and/or corresponding depth information in associated depth data. These pixels in the texture hole regions (e.g., 106-1, 106-2, etc.) may represent disoccluded portions of an image (or image frame) depicted by the synthesized texture data (114-1) that were previously occluded (e.g., hidden behind visual objects, etc.) in pre-synthesized views used to generate the synthesized views.

Since the pre-synthesized views have those disoccluded portions occluded, the pre-synthesized views do no contain texture data portions for these texture hole regions (or disoccluded portions) of the image depicted by the synthesized texture data (114-1).

Under techniques as described herein, for each texture hole region as indicated in the texture hole mask (118-1), bordering pixels of the hole region can be located first. Then, (e.g., automatic, one-dimensional, for generating at most two clusters, etc.) clustering is performed on depth values (e.g., distance values, disparity values, etc.) of those bordering pixels of the texture hole region, thereby generating a depth value threshold (e.g., a distance value threshold, a disparity value threshold, etc.) for distinguishing background depth values from foreground object depth values for the texture hole region.

FIG. 1C illustrates an example texture hole region 106. Initially, bordering pixels of the texture hole region may be identified as pixels along a texture hole region border 108 demarcating the texture hole region (106). The texture hole region border (108) may be a closed border if the texture hole region (106) lies inside the image frame. The texture hole region border (108) may be an open border if the texture hole region (106) has a border portion coinciding with the overall border of the image (or the image frame) depicted in the synthesized texture data (e.g., 114, 114-1, etc.).

The bordering pixels lie outside in immediate adjacency to the texture hole region border (108) and have valid (texture) pixel values in the synthesized texture data (e.g., 114, 114-1, etc.). Depth values for the bordering pixels are in the associated depth data (e.g., 116, etc.). These depth values for the bordering pixels may be identified based on the associated depth data (e.g., 116, etc.) generated for the synthesized texture data (e.g., 114, 114-1, etc.). The identified depth values for the bordering pixels can be (e.g., automatically, in one dimensional, for generating at most two clusters, etc.) clustered into two depth value clusters along with a depth value threshold (e.g., a distance value threshold, a disparity value threshold, etc.) that separates the two mutually exclusive depth value clusters. Correspondingly, based on which depth value clusters bordering pixels belong, the bordering pixels can be clustered into two mutually exclusive bordering pixel clusters. More specifically, any bordering pixels (among all the bordering pixels delineating the texture hole region (106)) with depth values in the first depth value clusters of the two depth value clusters can be clustered into a first bordering pixel cluster of the two bordering pixel clusters. Any bordering pixels (among all the bordering pixels delineating the texture hole region (106)) with depth values in the second depth value clusters of the two depth value clusters can be clustered into a second bordering pixel cluster of the two bordering pixel clusters.

One of the two bordering pixel clusters can then be identified as a cluster of background pixels. In an example, if the depth values and the depth value threshold are measured or represented in distance values (or z-values), then one of the two bordering pixel clusters comprises bordering pixels with depth values greater than the depth value threshold (represented as a distance value threshold); these bordering pixels are deemed or considered to be bordering background pixels while bordering pixels in the other of the two bordering pixel clusters are declared, deemed and/or considered to be foreground pixels. In another example, if the depth values and the depth value threshold are measured or represented in disparity values, then one of the two bordering pixel clusters comprises bordering pixels with depth values no greater than the depth value threshold (represented as a disparity value threshold); these bordering pixels are deemed or considered to be bordering background pixels while bordering pixels in the other of the two bordering pixel clusters are declared, deemed and/or considered to be foreground pixels.

By way of illustration but not limitation, a (e.g., proper, etc.) subset of bordering pixels such as shown as (dots) 110 of FIG. 1C may be identified as bordering background pixels for the texture hole region (106) through clustering. The remainder bordering pixels may be identified as bordering non-background pixels 130 for the texture hole region (106).

Any combination of a wide variety of (e.g., automatic, etc.) clustering operations/methods/algorithms may be used to (e.g., automatically, with no or little human intervention, etc.) determine a depth value threshold and cluster depth values of bordering pixels as described herein into two depth value clusters with the depth value threshold. Some or all of these clustering operations/methods/algorithms may be used to perform clustering with a distance measure by minimizing intra-cluster distances of clustering samples (e.g., depth values, etc.) while maximizing the inter-cluster distance between the two depth value clusters.

Under techniques as described herein, the bordering background pixels (110) may be used to estimate depth values for hole pixels located in the texture hole region (106). The depth values may be estimated for the hole pixels from a plurality of candidate estimation directions. These candidate directions may be discretized angles that are distributed in some or all 360 angular degrees surrounding any hole pixel or any texture hole region (e.g., 106).

4. ESTIMATION DIRECTIONS

Figure 2A:
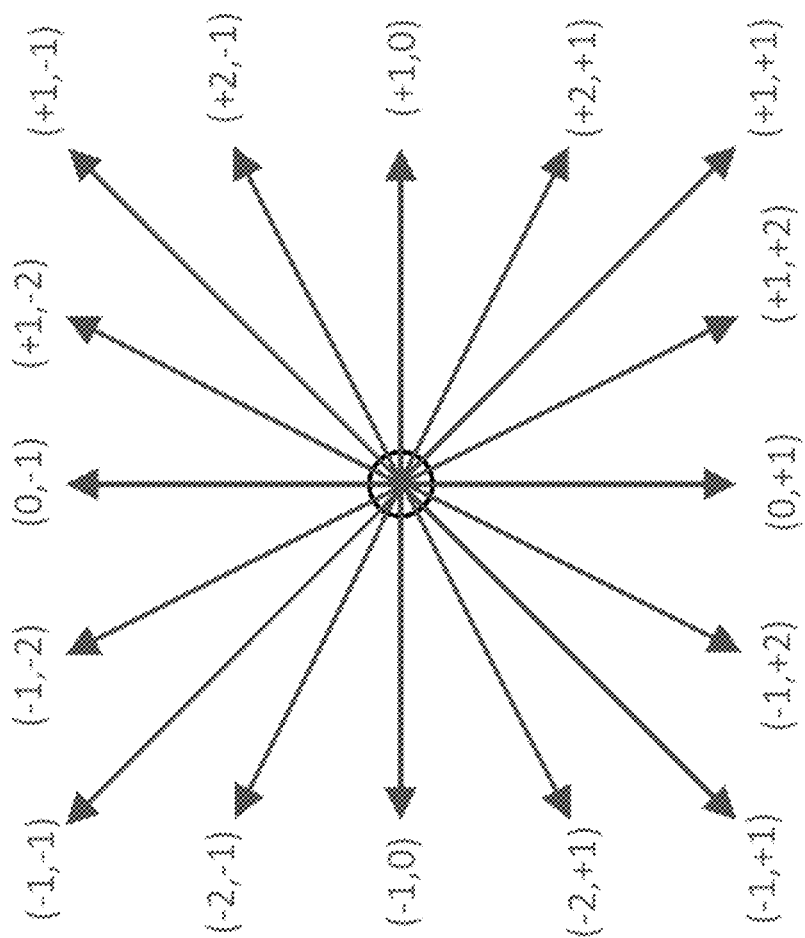
FIG. 2A illustrates example candidate estimation directions.

FIG. 2A illustrates (e.g., sixteen, fewer than sixteen, more than sixteen, etc.) example candidate estimation directions that may be used to estimate depth values of hole pixels in a texture hole region (e.g., 106, 106-1, 106-2, etc.). Each of the candidate estimation directions may be represented by a two-dimensional (2D) offset (or displacement) vector. For example, one of the candidate estimation directions may be represented as a 2D offset vector (+1, −1), which means offset of +1 in the horizontal direction and −1 in the vertical direction, assuming the positive direction for the horizontal direction is from left to right and the positive direction for the vertical direction is from top to bottom.

Figure 2B:
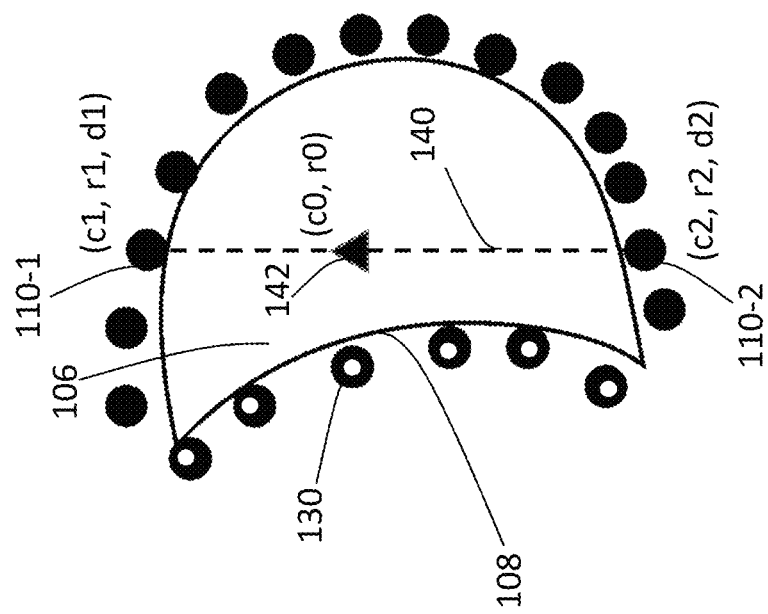
FIG. 2B illustrates example depth estimation.

FIG. 2B illustrates example texture hole depth value estimation of a texture hole pixel 142 along a candidate estimation direction 140 (e.g., for each candidate estimation direction as illustrated in FIG. 2A, etc.).

Depth values of bordering background pixels (e.g., 110, 110-1, 110-2, etc.) in a synthesized image (e.g., 114 of FIG. 1A, 114-1 of FIG. 1B, etc.) of a target view can be determined using a texture hole mask (e.g., 118 of FIG. 1A, 118-1 of FIG. 1B, etc.) and depth data (e.g., 116, etc.) generated with the synthesized image. The (background) depth values (denoted as "d") of the bordering background pixels (e.g., 110, 110-1, 110-2, etc.) can be considered or deemed as depth values given by a (depth) function (denoted as "f ( . . . )") of two-dimensional (2D) variables (denoted as "c" and "r" respectively) corresponding to column and row positions of the bordering background pixels, as follows:

$$d = f(c, r) \tag{1}$$

where d represents a depth value of a pixel (e.g., a bordering background pixel, a texture hole pixel, etc.) at a column position "c" and a row position "r".

With this depth-function-based model, the depth value of a texture hole pixel can be obtained by surface interpolation or by interpolation as implemented in the depth function "f( . . . )" in expression (1) above from depth values of the bordering background pixels (e.g., 110, 110-1, 110-2, etc.) as determined in the depth data (116). A wide variety of interpolation methods/algorithms/operations can be implemented by the depth function "f( . . . )", including but not necessarily limited to only, bilinear interpolation, linear interpolation, etc. Depth interpolation operations that generate depth value estimations in a texture hole region enable backward warping of the texture hole region or any texture hole pixel therein from a target view into a reference view in time domain.

By way of illustration but not limitation, linear interpolation may be applied to deriving the depth value for a texture hole pixel at a column position "c0" and a row position "r0".

Given the candidate estimation direction (140) (e.g., a vertical line, a non-vertical line, etc.), two background pixels 110-1 and 110-2 can be determined or identified as on the candidate estimation direction (140) at column and row positions of (c1, r1) and (c2, r2), respectively. The two background pixels (110-1 and 110-2) may represent the two nearest background pixels to the texture hole pixel (142), the bordering background pixels on a texture hole border 108 delineating a texture hole 106, etc., on both sides of the texture hole pixel (142) along the candidate estimation direction (140).

Based on the depth data (116) generated with the synthesized image of the target view, the depth values of the two background pixels (110-1 and 110-2) can be obtained or determined. The depth of the texture hole pixel (142) can then be obtained by linear interpolation using row positions so long as (r1−r2) is not zero, as follows:

$$d = d2 + \frac{r0 - r2}{r1 - r2}(d1 - d2) \tag{2}$$

Additionally, optionally or alternatively, the depth of the texture hole pixel (142) can also be obtained by linear interpolation using distance ratio so long as the distance from (c1,r1) to (c2,r2) is not zero, as follows:

$$d = d2 + \frac{\text{distance}((c0, r0), (c2, r2))}{\text{distance}((c1, r1), (c2, r2))}(d1 - d2) \quad (3)$$

In some operational scenarios, multiple candidate estimation directions (e.g., as illustrated in FIG. 2A, etc.) can be searched to find a line or a candidate estimation direction that has two background pixels surrounding the texture hole pixel (142). In some embodiments, the search in the multiple candidate estimation direction can stop when the first such line or candidate estimation direction with two background pixels surrounding the texture hole pixel (142) is found. Additionally, optionally or alternatively, each candidate estimation direction in some or all of the multiple candidate estimation directions can be searched. A specific candidate estimation direction can be selected from among a subset— each candidate direction in the subset has two background pixels surrounding the texture hole pixel (142)—of the multiple candidate estimation directions, for example using one or more selection criteria. The one or more selection criteria may specify that the candidate estimation direction with the minimum or lowest depth variance of the two background pixels is to be selected from the subset of the multiple candidate estimation directions.

Figure 4A:
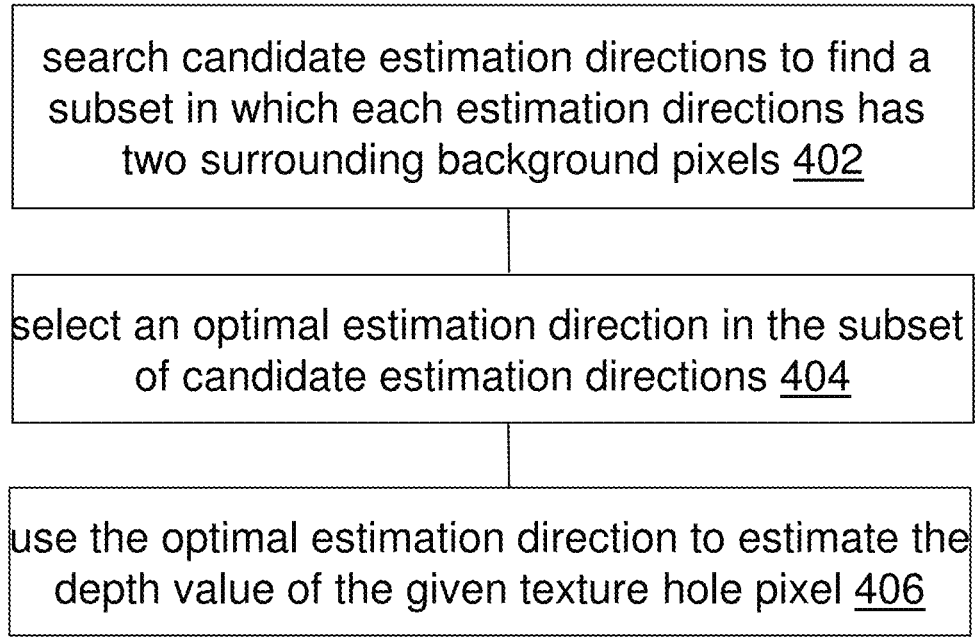

FIG. 4A illustrates an example process flow that may be used to determine the depth value of a given texture hole pixel (e.g., 142, etc.) in a texture hole region (e.g., 106, etc.). The process flow may be performed by a video codec (e.g., a video decoder, a video encoder, a video transcoder, a video streaming server, a video streaming client, etc.) implemented with one or more computing devices.

Block 402 comprises searching all candidate estimation directions to find a subset of candidate estimation directions each of which has two surrounding background pixels (e.g., the nearest background pixels, bordering background pixels on a texture hole border delineating the texture hole region, etc.) for the given texture hole pixel.

Block 404 comprises selecting an optimal estimation direction (e.g., 140, etc.) in the subset of candidate estimation directions.

Block 406 comprises using the optimal estimation direction to estimate the depth value of the given texture hole pixel.

Figure 4B:
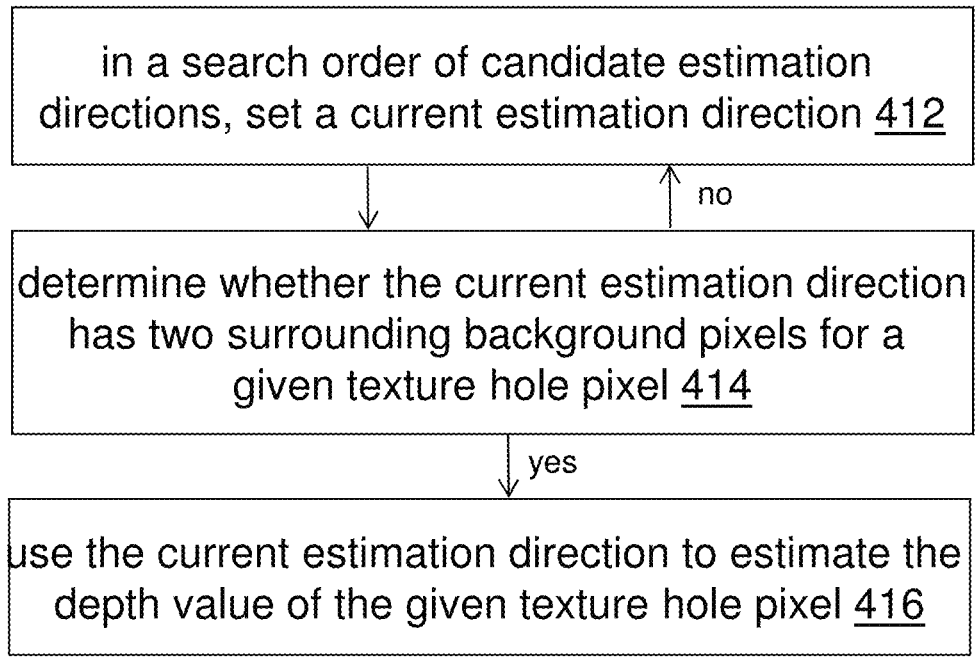

FIG. 4B illustrates an example process flow that may be used to determine the depth value of a given texture hole pixel (e.g., 142, etc.) in a texture hole region (e.g., 106, etc.). The process flow may be performed by a video codec (e.g., a video decoder, a video encoder, a video transcoder, a video streaming server, a video streaming client, etc.) implemented with one or more computing devices.

Block 412 comprises, in a search order of all candidate estimation directions, setting the next candidate estimation direction (initially the first candidate estimation direction in all the candidate estimation directions) in the search order as a current estimation direction.

Block 414 comprises determining whether the current estimation direction has two surrounding background pixels (e.g., the nearest background pixels, bordering background pixels on a texture hole border delineating a texture hole, etc.) for the given texture hole pixel. If so, the process flow goes to block 416. Otherwise, the process flow goes to block 412.

Block 416 comprises using the current estimation direction to estimate the depth value of the given texture hole pixel.

Figure 1D:
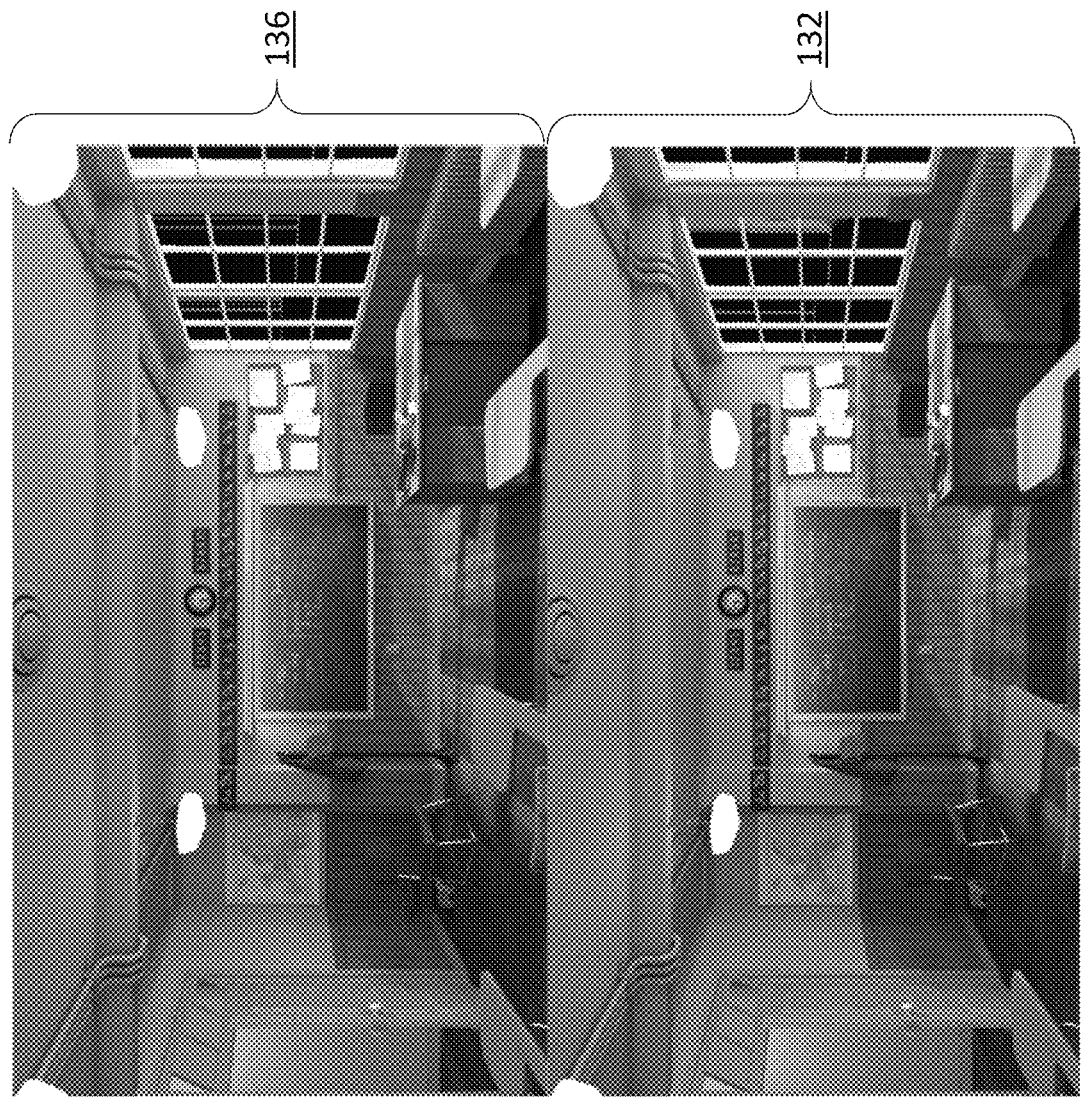
FIG. 1D illustrates example hole-filled image generated through temporal hole filling operations and a reference image used in the temporal hole filling operations.
Figure 1E:
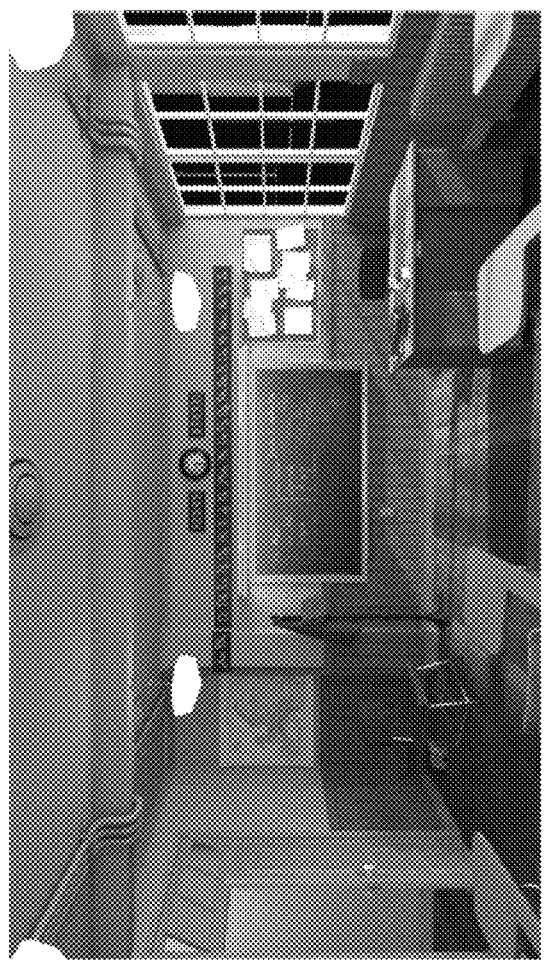
FIG. 1E illustrates an example hole-filled image generated through spatial hole filling operations.

FIG. 1D illustrates an example hole-filled image 132 for which temporal hole filling operations have been performed. The temporal hole-filled image may be generated by performing the temporal hole filling operations on the synthesized texture data (e.g., 114 of FIG. 1A, 114-1 of FIG. 1B, etc.) using a temporal reference image 136 to fill in or predict pixel values of texture hole regions of the synthesized texture data (e.g., 114 of FIG. 1A, 114-1 of FIG. 1B, etc.) in DIBR operations (e.g., 104 of FIG. 1A, etc.). The temporal hole-filling operations include backward warping texture hole regions in a target view as represented by the synthesized texture data (e.g., 114 of FIG. 1A, 114-1 of FIG. 1B, etc.) to a reference view as represented by the temporal reference image (136), thereby obtaining or predicting pixel values of the texture hole regions in the target view.

In some operational scenarios, as a user of a video display application (e.g., movies, TV programs, remote presence application, VR application, AR application, computer game, etc.) navigates through a volumetric light field, different reference views are selected to help render target views. From one target view to the next, selections of respective reference images for the target views may undergo sudden changes that introduce many large texture hole regions in synthesized (or in unmitigated rendered) target views. Using spatial hole filling methods may not be effective in these operational scenarios. Temporal hole filling methods can be relatively effective because the user's view position (versus the user's view direction/orientation) changes slowly and a temporal reference image such as that of a previously (e.g., immediately preceding, etc.) rendered view is likely contain background texture information that can be used to compensate for sudden reference view changes.

As illustrated in a synthesized image 114-1 in FIG. 1B, a small change in the user's target view position may cause a relatively sudden reference view change (e.g., a sudden change in reference selection because of the camera array layout, etc.), which in turn causes large texture holes in synthesized (or in unmitigated rendered) view.

As shown, in the hole-filled image (132), texture hole regions in the synthesized texture data (114 of FIG. 1B) have been significantly reduced or shrunk by the temporal hole filling operations without introducing visual artifacts. Further, as compared with a hole-filled image of FIG. 1E that is generated using spatial hole filling operations, the hole-filled image (132) of FIG. 1D that is generated using temporal hole filling operations provides relatively natural texture.

Figure 4C:
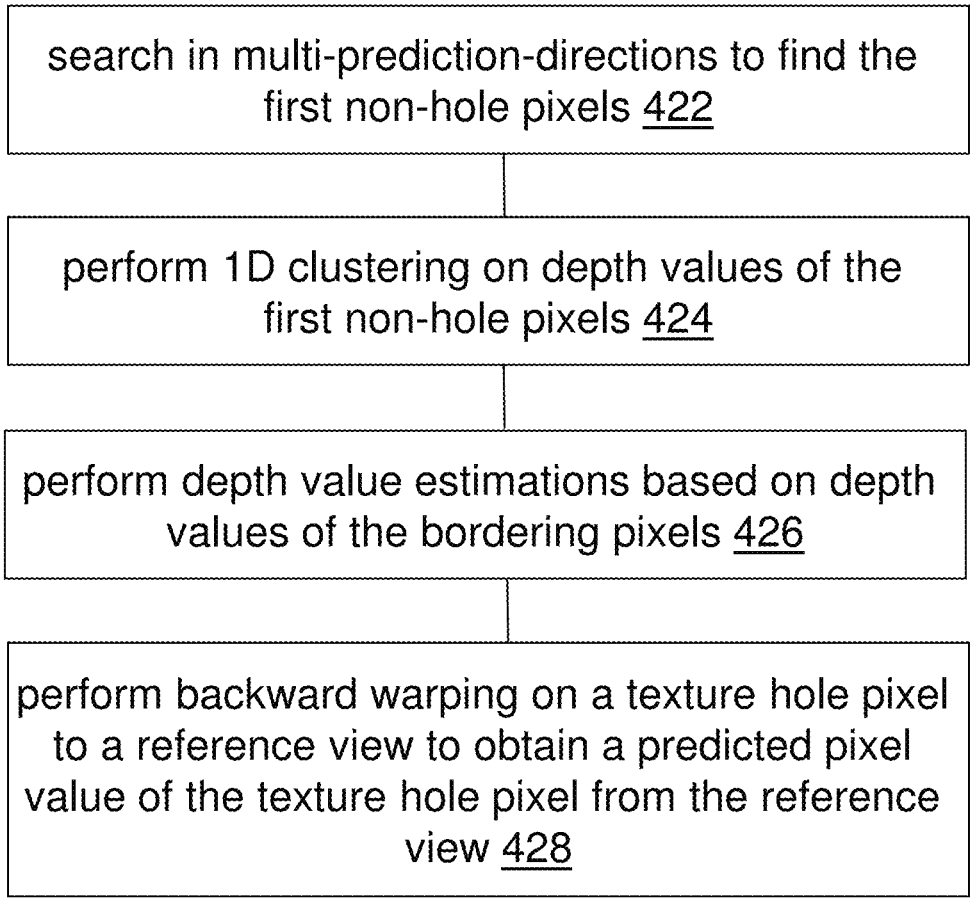

FIG. 4C illustrates an example process flow for temporal texture hole filling operations. The process flow may be performed by a video codec (e.g., a video decoder, a video encoder, a video transcoder, a video streaming server, a video streaming client, etc.) implemented with one or more computing devices.

Block 422 comprises, for a currently processed texture hole pixel, searching in multiple candidate estimation directions to find first (e.g., the closest along each direction, etc.) non-hole pixels and recording the position and depth value of each of the first non-hole pixels.

Block 424 comprises performing one-dimensional (1D) clustering on the recorded depth values to two depth value clusters, obtaining a depth value threshold used to identify one of the two depth value clusters as comprising background depths.

Block 426 comprises, for those candidate estimation directions each resulting in two bordering or closest pixels with background depths, performing estimations of the depth value of the currently processed texture hole pixel based on depth values of the bordering or closest pixels.

Block 428 comprises performing backward warping on the currently processed texture hole pixel to a reference view (e.g., a previously rendered image, etc.) to obtain texture information for the currently processed texture hole pixel. In some embodiments, the reference view (e.g., a previously rendered image, etc.) with its corresponding synthesized texture data and depth data has been saved in memory (e.g., a reference image buffer, etc.).

5. PARALLEL HOLE-FILLING OPERATIONS

Some or all temporal hole filling operations as described herein can be implemented in a parallel architecture. Each texture hole pixel in the same texture hole or different texture holes can be independently processed (e.g., with no data dependency, with no synchronization dependency, etc.) and backward warped to a temporal reference image (e.g., a previously rendered view, etc.) to obtain texture information from the temporal reference image (or view). Corresponding real-time implementation of the parallel architecture can be realized with single-instruction-multi-data (SIMD), multi-core DSPs, or GPUs such as CUDA-based GPU, commercially available from Nvidia Corporation, Santa Clara, Calif.

For example, a parallel temporal hole filling method may be implemented using multi-direction depth estimation. This temporal parallel hole filling method can be used to perform realtime temporal hole filling operations with each texture hole pixel in (e.g., complete, full, etc.) in a texture hole region independence of other realtime temporal hole filling operations with any other texture hole pixel in the same or a different texture hole region. Thus, realtime temporal hole filling operations with any texture hole pixel can be performed (as permitted or supported by available computational resources) concurrently without any synchronization dependencies and/or data dependencies on any other real-time temporal hole filling operations with any other texture hole pixel.

6. EXAMPLE VIDEO STREAMING SERVERS AND CLIENTS

Figure 3A:
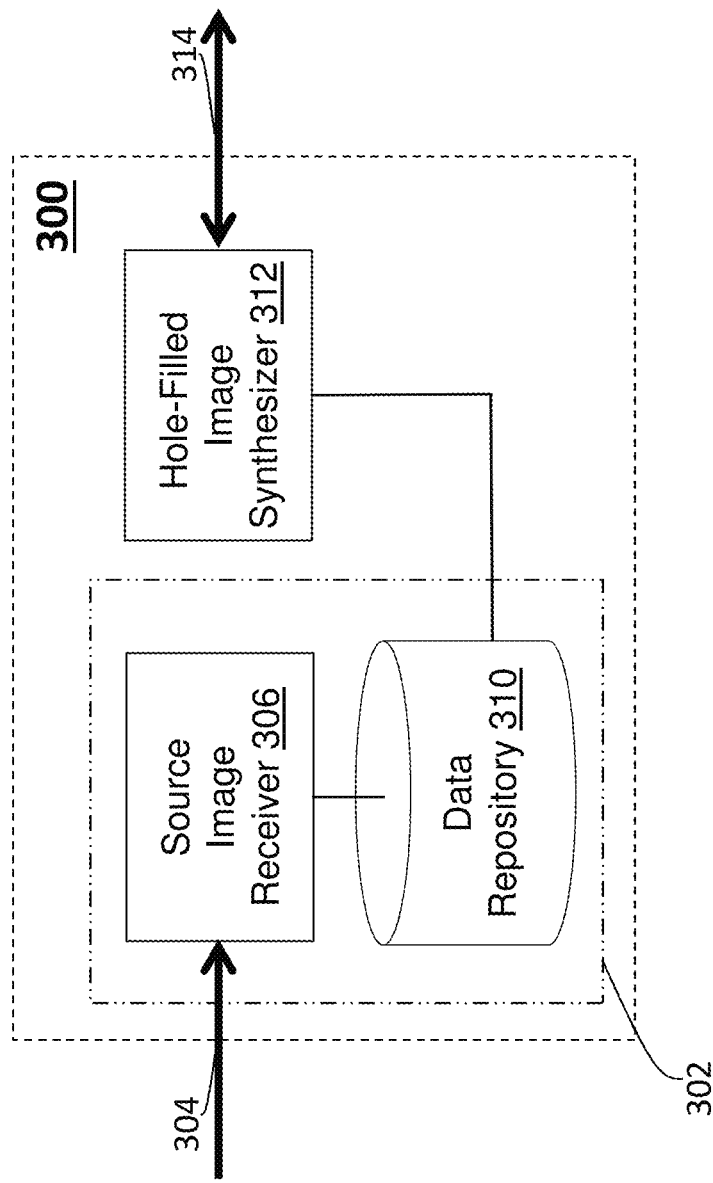
FIG. 3A through FIG. 3C illustrate example video streaming servers and clients.

FIG. 3A illustrates an example video streaming server 300 that comprises a synthesized image processor 302, a hole-filled image synthesizer 312, etc. In some embodiments, the synthesized image processor (302) comprises a source image receiver 306, a data repository 310, etc. Some or all of the components of the video streaming server (300) may be implemented by one or more devices, modules, units, etc., in software, hardware, a combination of software and hardware, etc.

In some embodiments, the source image receiver (306) comprises software, hardware, a combination of software and hardware, etc., configured to receive an input multi-view image stream 304 from a multi-view image source such as a cloud-based multi-view image source, a camera system in connection with a VR application, an AR application, a remote presence application, a display application, etc.; decode the input multi-view image stream (304) into one or more input multi-view images (e.g., a sequence of input multi-view images, 122 of FIG. 1A, etc.); etc.

In some embodiments, the data repository (310) represents one or more databases, one or more data storage units/modules/devices, etc., configured to support operations such as storing, updating, retrieving, deleting, etc., with respect to some or all of the input multi-view images, etc.

In some embodiments, the hole-filled image synthesizer (312) comprises software, hardware, a combination of software and hardware, etc., configured to generate a video stream encoded with hole-filled synthesized images derived from corresponding input multi-view images, etc. The video stream may be delivered to a downstream device via the bidirectional data flow 314 (e.g., directly or indirectly through intermediate devices, etc.). The downstream device may represent a video streaming client, a display device, a storage device, a video decoder operating with a target display, etc.

Additionally, optionally, or alternatively, some or all of image processing operations such as display management, content mapping, color mapping, etc., may be performed by the video streaming server (300).

The video streaming server (300) may be used to support real time immersive video applications, near-real-time immersive video applications, real time non-immersive video applications, near-real-time non-immersive video applications, non-real-time immersive video applications, virtual reality, augmented reality, automobile entertainment, helmet mounted display applications, heads up display applications, games, 2D display applications, 3D display applications, multi-view display applications, etc.

Figure 3B:
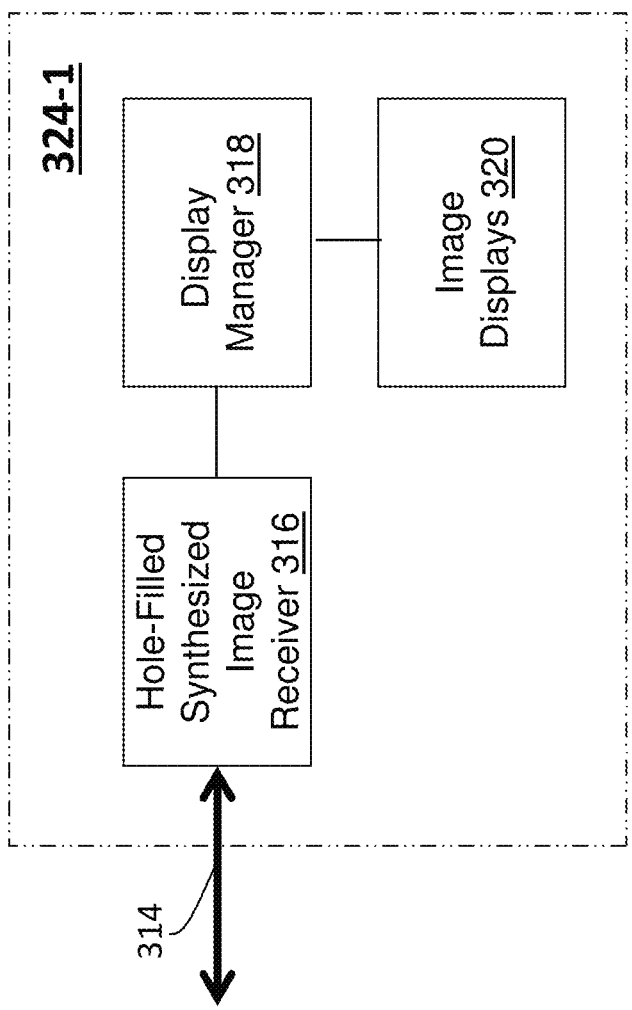

FIG. 3B illustrates an example image rendering system 324-1 that comprises a hole-filled synthesized image receiver 316, a display manager 318, one or more image displays (or one or more target displays) 320, etc. Some or all of the components of the image rendering system (324-1) may be implemented by one or more devices, modules, units, etc., in software, hardware, a combination of software and hardware, etc.

In some embodiments, the hole-filled synthesized image receiver (316) comprises software, hardware, a combination of software and hardware, etc., configured to receive a video stream encoded with hole-filled synthesized images; etc.

In some embodiments, the image rendering system (324-1) is configured to generate synthesized video content to be rendered on the user's display. In some embodiments, a hole-filled synthesized image decoded from the received video stream may be applied with display management (DM) operations (performed by the display manager (318)), de-blocking operations, de-contouring operations, blurring operations, etc., to generate display images to be rendered on the user's display.

Additionally, optionally, or alternatively, some or all of image rendering operations such as content mapping, tone mapping, color mapping, field-of-view management, prediction, etc., may be performed by the image rendering system (324-1).

The image rendering system (324-1) may be used to support real time immersive video applications, near-real-time immersive video applications, non-real-time immersive video applications, real time non-immersive video applications, near-real-time non-immersive video applications, non-real-time non-immersive video applications, virtual reality, augmented reality, automobile entertainment, helmet mounted display applications, heads up display applications, games, 2D display applications, 3D display applications, multi-view display applications, etc.

Techniques as described herein can be implemented in a variety of system architectures. Some or all image processing operations as described herein can be implemented by one or more of cloud-based video streaming servers, video streaming servers collocated with or incorporated into video streaming clients, image rendering systems, image rendering systems, display devices, etc. Based on one or more factors such as types of video applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

Figure 3C:
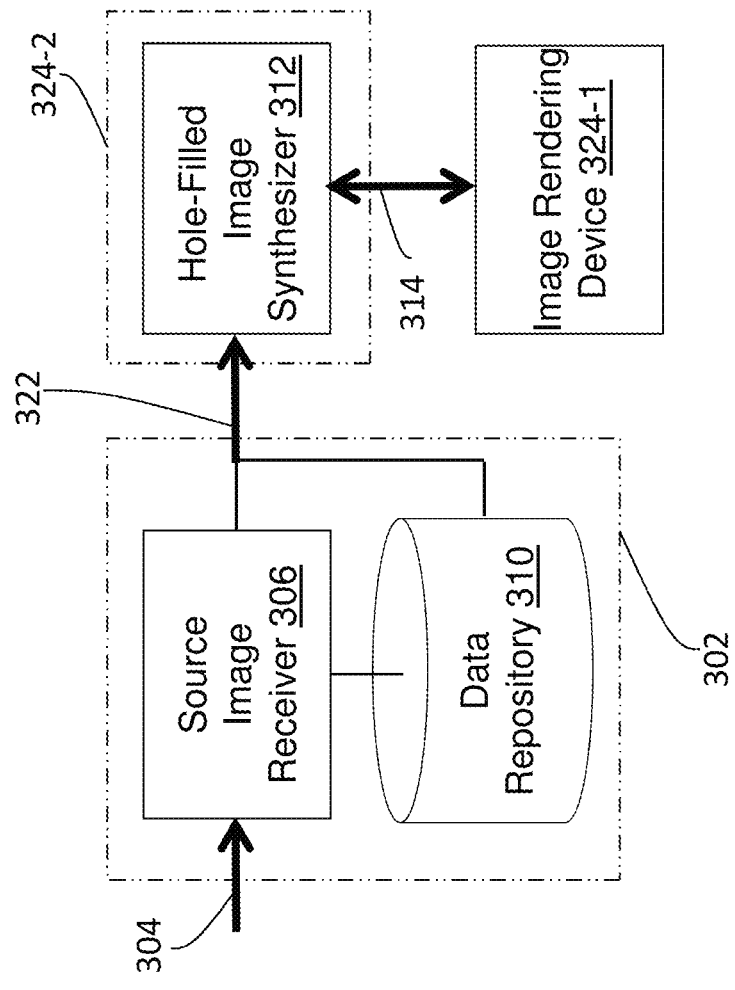

FIG. 3C illustrates an example configuration in which a hole-filled image synthesizer (e.g., 312, etc.) is incorporated into an edge video streaming server 324-2. In some embodiments, a synthesized image processor 302 of FIG. 3C may be cloud-based. In some embodiments, the synthesized image processor (302) may be located in a core network separate from edge devices such as the edge video streaming server (324-2). As in FIG. 3A, the synthesized image processor (302) may comprise a source image receiver 306, a data repository 310, etc. The synthesized image processor (302) may represent an upstream video streaming server that communicates with the edge video streaming server (324-2) over relatively high bitrates. Some or all of the components of the synthesized image processor (302) and/or the edge video streaming server (324-2) may be implemented by one or more devices, modules, units, etc., in software, hardware, a combination of software and hardware, etc.

In some embodiments, the synthesized image processor (302) is configured to output multi-view images in a data flow 322 to downstream devices one of which may be the edge video streaming server (324-2).

In some embodiments, the edge video streaming server (324-2), or the hole-filled image synthesizer (312) therein, comprises software, hardware, a combination of software and hardware, etc., configured to generate a video stream encoded with hole-filled synthesized images derived from corresponding multi-view images. The video stream may be delivered to a downstream device via the bidirectional data flow 314 (e.g., directly or indirectly through intermediate devices, etc.).

In some embodiments, an image rendering device (e.g., 324-1), or a display manager (e.g., 318 of FIG. 2B) therein, comprises software, hardware, a combination of software and hardware, etc., configured to perform DM operations on hole-filled synthesized video content to be rendered on one or more image displays to generate display video content; output the display video content (e.g., in an HDMI signal, etc.) to the image displays for rendering; etc.

Some or all techniques as described herein can operate with machine learning techniques. Any, some or all operational parameters used in performing image synthesis, automatic clustering, selecting optimal estimation directions, etc., may be machine learned. Additionally, optionally or alternatively, some or all hole filling operations as described herein may operate in conjunction with other types of hole filling operations. For example, larger holes may be filled by selected textures (e.g., a jigsaw, etc.) as specified by video professionals, whereas smaller texture hole regions may be filled by background pixels that are identified using techniques as described herein. Initialization. Additionally, optionally or alternatively, some or all operational parameters used in performing image synthesis, automatic clustering, selecting optimal estimation directions, etc., may be signaled by a video encoder to a video decoder. For example, whether an average background pixel value is to be used to fill in pixel values of texture hole pixels can be signaled by a video encoder to a video decoder.

7. EXAMPLE PROCESS FLOWS

FIG. 4D illustrates an example process flow according to an example embodiment of the present invention. In some example embodiments, one or more computing devices or components may perform this process flow. In block 432, a synthesized image processor (e.g., a video streaming server or a video streaming client of FIG. 3A through FIG. 3C, etc.) identifies a plurality of bordering pixels delineating a texture hole region in a target image, the target image representing a target view to be rendered at a first time point.

In block 434, the synthesized image processor records a plurality of depth values of the plurality of bordering pixels, each depth value in the plurality of depth values corresponding to a respective bordering pixel in the plurality of bordering pixels.

In block 436, the synthesized image processor automatically clusters (or segments) the plurality of depth values into two depth value clusters with a depth value threshold separating a first depth value cluster of the two depth value clusters from a second depth value cluster of the two depth value clusters, the first depth value cluster comprising background depth values.

In block 438, the synthesized image processor selects a specific estimation direction from among a plurality of candidate estimation directions for a texture hole pixel in the texture hole region.

In block 440, the synthesized image processor estimates a depth value of the texture hole pixel by interpolating depth values of two bordering background pixels in the specific estimation direction, the depth values of the two bordering background pixels belonging to the first depth value cluster.

In block 442, the synthesized image processor uses the estimated depth value to warp the texture hole pixel into a reference view represented by a reference image rendered at a second time point that is different from the first time point, the texture hole pixel as warped into the reference view being used to identify a reference pixel in the reference image.

In block 444, the synthesized image processor predicts a pixel value of the texture hole pixel based at least in part on a reference pixel value of the reference pixel from the reference image.

In an embodiment, the texture hole region is identified based on a texture hole mask that comprises a binary value for each pixel in the image to indicate whether each such pixel is a texture hole pixel.

In an embodiment, the image comprises a plurality of texture hole regions that include the texture hole region.

In an embodiment, the image represents a synthesized image from applying depth-image-based rendering to one or more pre-synthesized texture images and one or more corresponding depth images.

In an embodiment, the plurality of depth values comprises one of: distance-based depth values or disparity-based depth values.

In an embodiment, the plurality of depth values is automatically clustered into a background depth value cluster and a foreground depth value cluster using one or more of: a centroid-based algorithm, a density-based algorithm, a K-means clustering algorithm, Jenks natural breaks optimization, and so forth.

In an embodiment, the specific estimation direction is selected based on a plurality of differences each of which represents a difference between depth values of a pair of background pixels in a subset of candidate estimation directions in the plurality of candidate estimation directions; each candidate estimation direction in the subset of candidate estimation directions has two background pixels for the texture hole pixel in the candidate estimation direction.

In an embodiment, an image metadata portion is encoded in a video stream along with the target image; a downstream decoder that receives the video stream performs at least a part of temporal hole filling operations for the texture hole region of the target image based on the image metadata portion as signaled in the video stream.

In an embodiment, the method is performed by one of: a video decoder, a video encoder, a video transcoder, and so forth.

In an embodiment, the method is independently performed by a processing thread for each texture hole pixel in the image.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

8. IMPLEMENTATION MECHANISM—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
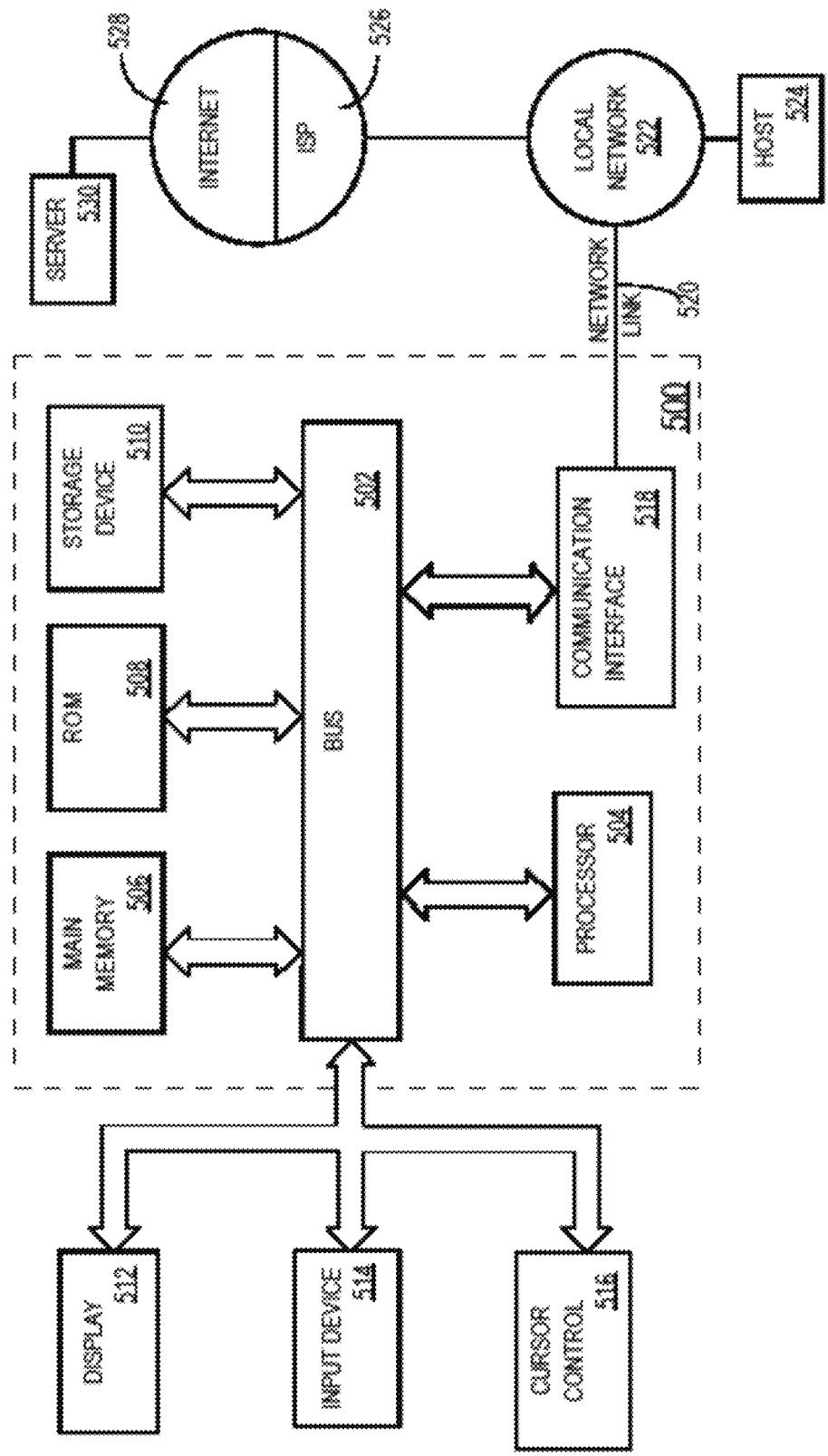
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of the present invention.

EEE1. A computer-implemented method, comprising:
identifying a plurality of bordering pixels delineating a texture hole region in a target image, the target image representing a target view to be rendered at a first time point;
recording a plurality of depth values of the plurality of bordering pixels, each depth value in the plurality of depth values corresponding to a respective bordering pixel in the plurality of bordering pixels;
automatically clustering the plurality of depth values into two depth value clusters with a depth value threshold separating a first depth value cluster of the two depth value clusters from a second depth value cluster of the two depth value clusters, the first depth value cluster comprising background depth values;
selecting a specific estimation direction from among a plurality of candidate estimation directions for a texture hole pixel in the texture hole region;
estimating a depth value of the texture hole pixel by interpolating depth values of two bordering background pixels in the specific estimation direction, the depth values of the two bordering background pixels belonging to the first depth value cluster;
using the estimated depth value to warp the texture hole pixel into a reference view represented by a reference image rendered at a second time point that is different from the first time point, the texture hole pixel as warped into the reference view being used to identify a reference pixel in the reference image;
predicting a pixel value of the texture hole pixel based at least in part on a reference pixel value of the reference pixel from the reference image.

EEE2. The method of EEE1, wherein the texture hole region is identified based on a texture hole mask that comprises a binary value for each pixel in the image to indicate whether each such pixel is a texture hole pixel.

EEE3. The method of EEE1, wherein the image comprises a plurality of texture hole regions that include the texture hole region.

EEE4. The method of EEE1, wherein the image represents a synthesized image from applying depth-image-based rendering to one or more pre-synthesized texture images and one or more corresponding depth images.

EEE5. The method of EEE1, wherein the plurality of depth values comprises one of: distance-based depth values or disparity-based depth values.

EEE6. The method of EEE1, wherein the plurality of depth values is automatically clustered into a background depth value cluster and a foreground depth value cluster using one or more of: a centroid-based algorithm, a density-based algorithm, a K-means clustering algorithm, or Jenks natural breaks optimization.

EEE7. The method of EEE1, wherein the specific estimation direction is selected based on a plurality of differences each of which represents a difference between depth values of a pair of background pixels in a subset of candidate estimation directions in the plurality of candidate estimation directions; and wherein each candidate estimation direction in the subset of candidate estimation directions has two background pixels for the texture hole pixel in the candidate estimation direction.

EEE8. The method of EEE1, wherein an image metadata portion is encoded in a video stream along with the target image; wherein a downstream decoder that receives the video stream performs at least a part of temporal hole filling operations for the texture hole region of the target image based on the image metadata portion as signaled in the video stream.

EEE9. The method of EEE1, wherein the method is performed by one of: a video decoder, a video encoder, or a video transcoder.

EEE10. The method of EEE1, wherein the method is independently performed by a processing thread for each texture hole pixel in the image.

What is claimed is:

1. A computer-implemented method, comprising:
    identifying a plurality of bordering pixels delineating a texture hole region in a target image, the target image representing a target view to be rendered at a first time point;
    recording a plurality of depth values of the plurality of bordering pixels, each depth value in the plurality of depth values corresponding to a respective bordering pixel in the plurality of bordering pixels;
    automatically clustering the plurality of depth values into two depth value clusters with a depth value threshold separating a first depth value cluster of the two depth value clusters from a second depth value cluster of the two depth value clusters, the first depth value cluster comprising background depth values;
    selecting a specific estimation direction from among a plurality of candidate estimation directions for a texture hole pixel in the texture hole region;
    estimating a depth value of the texture hole pixel by interpolating depth values of two bordering background pixels in the specific estimation direction, the depth values of the two bordering background pixels belonging to the first depth value cluster;
    using the estimated depth value to warp the texture hole pixel into a reference view represented by a reference image rendered at a second time point that is different from the first time point, the texture hole pixel as warped into the reference view being used to identify a reference pixel in the reference image;
    predicting a pixel value of the texture hole pixel based at least in part on a reference pixel value of the reference pixel from the reference image.

2. The method of claim 1, wherein the texture hole region is identified based on a texture hole mask that comprises a binary value for each pixel in the image to indicate whether each such pixel is a texture hole pixel.

3. The method of claim 1, wherein the image comprises a plurality of texture hole regions that include the texture hole region.

4. The method of claim 1, wherein the image represents a synthesized image from applying depth-image-based rendering to one or more pre-synthesized texture images and one or more corresponding depth images.

5. The method of claim 1, wherein the plurality of depth values comprises one of: distance-based depth values or disparity-based depth values.

6. The method of claim 1, wherein the plurality of depth values is automatically clustered into a background depth value cluster and a foreground depth value cluster using one or more of: a centroid-based algorithm, a density-based algorithm, a K-means clustering algorithm, or Jenks natural breaks optimization.

7. The method of claim 1, wherein the specific estimation direction is selected based on a plurality of differences each of which represents a difference between depth values of a pair of background pixels in a subset of candidate estimation directions in the plurality of candidate estimation directions; and wherein each candidate estimation direction in the subset of candidate estimation directions has two background pixels for the texture hole pixel in the candidate estimation direction.

8. The method of claim 1, wherein an image metadata portion is encoded in a video stream along with the target image; wherein a downstream decoder that receives the video stream performs at least a part of temporal hole filling operations for the texture hole region of the target image based on the image metadata portion as signaled in the video stream.

9. The method of claim 1, wherein the method is performed by one of: a video decoder, a video encoder, or a video transcoder.

10. The method of claim 1, wherein the method is independently performed by a processing thread for each texture hole pixel in the image.

11. A non-transitory computer readable storage medium, storing software instructions, which when executed by one or more processors cause performance of the method recited in claim 1.

12. A computing device comprising one or more processors and one or more storage media, storing a set of instructions, which when executed by one or more processors cause performance of the method recited in claim 1.

* * * * *